Patented Oct. 5, 1954

2,691,053

UNITED STATES PATENT OFFICE 2,691,053

PRODUCTION OF 1,1,1-TRIFLUORO-2,2,2-TRICHLOROETHANE

Cyril Woolf, Long Island City, N. Y., assignor to Allied Chemical & Dye Corporation, New York, N. Y., a corporation of New York No Drawing. Application October 17, 1951, Serial No. 251,810

8 Claims. (Cl. 260—653)

This invention relates to manufacture of 1,1,1-trifluoro-2,2,2-trichloroethane, $CCl_3CF_3$, useful as a chemical intermediate.

In prior art operations, for example when reacting HF with starting materials such as $C_2Cl_6$, $CCl_3CCl_2F$ and $CCl_3CClF_2$ in conjunction with the known catalysts of the antimony halide type, the reactions involved usually lead to the formation of the $CCl_2FCClF_2$ isomer of $CCl_3CF_3$.

The principal object of this invention lies in provision of procedures which result in the formation of reaction products containing substantial and preferably major quantities of $CCl_3CF_3$.

The starting materials which may be utilized in practice of the invention comprise compounds corresponding with the formula $C_2Cl_{6-x}F_x$, where $x=0$, 1 or 2. Examples of these compounds include $CCl_3CCl_2F$, $CCl_3CClF_2$, and also $C_2Cl_6$ in place of which mixtures of chlorine and $C_2Cl_4$ may be employed. More desirable starting materials comprise completely chlorofluoro halogenated ethanes containing at least four chlorine atoms. A preferred starting material for use in all phases of the invention is $CCl_3CClF_2$, and for convenience practice of the invention is exemplified by the application of the principles thereof to manufacture of $CCl_3CF_3$ from $CCl_3CClF_2$.

According to the invention, it has been found that when the starting materials noted are subjected to heat treatment, in the presence or absence of hydrogen fluoride, at herein indicated temperatures while in the presence of a lithium fluoride-activated carbon catalyst, the sought-for product $CCl_3CF_3$ is formed.

The process of the invention is an easily controlled vapor phase operation. In general practice, the starting material is initially vaporized and passed thru any suitable type of externally heated reactor containing the lithium fluoride-activated carbon catalyst. In situations where HF is not used as a reactant, the off-gas of the reactor may be cooled to e. g. zero to 15° C., and the condensate so obtained is preferably redistilled to recover a fraction boiling in the range of about 45–49° C. and usually in the range of 46–48° C. Such fraction contains the sought-for product $CCl_3CF_3$, B. P. 45.9° C. and M. P. 14.2° C., and may include some amounts of the $CCl_2FCClF_2$ isomer, B. P. 47.7° C. and M. P. minus 36.4° C. If an ultimate product consisting substantially entirely of $CCl_3CF_3$ is desired, a 45–49° C. fraction may be treated as known in the art, e. g. by agitating the liquid fraction at temperature of about 50° C. in the presence of aluminum chloride for time interval in the range of 2 to 10 hours to convert the $CCl_2FCClF_2$ isomer to $CCl_3CF_3$. In circumstances in which HF is used as a reactant, the reactor exit gas may be scrubbed with water to remove HCl and traces of HF, dried as by passage through calcium chloride, then cooled and the resulting condensate treated as described for recovery of $CCl_3CF_3$.

The invention comprises the discovery of properties of a lithium fluoride-activated carbon mass with respect to catalytic promotion of the reactions involved. These catalysts may be easily made by impregnating activated carbon with an aqueous solution having a lithium chloride, LiCl, concentration of e. g. 25%, drying, and thereafter gassing the mass with anhydrous HF at temperature in the range of 100–200° C. until tail gases of the HF gassing operation indicate that evolution of HCl and water has ceased. In making the catalyst, any of the commercially available activated carbons may be employed, e. g. Columbia 6G carbon, Columbia SW carbon, or Darco carbon. The relative quantities of activated carbon and lithium chloride initially employed may be such as to form an ultimate lithium fluoride-activated carbon mass which contains desirably a major quantity by weight of activated carbon and a minor quantity by weight of LiF. On the other hand, amounts of LiCl and activated carbon may be such as to form a final lithium fluoride-activated carbon catalyst containing as little as 3% by weight of LiF. The catalysts preferably employed in practice of the invention may be considered as a lithium fluoride on activated carbon mass containing about 5–20% by weight of LiF.

Temperatures employed in carrying out the invention reactions may lie in the range of 250–600° C., depending upon reaction completeness desired and such factors as time of contact between reactants and catalyst. Appreciable quantities of $CCl_3CF_3$ are formed at the lower temperature with a substantial contact time, although no significant advantages have been noted when reaction temperatures are above 600° C. The better results are obtained at higher temperature levels and accordingly temperatures in the range of 375–550° C. are preferred. Contact time is variable dependent upon temperature, and in the upper portions of the indicated temperature ranges contact time may be as little as e. g. 2–4 seconds, while at lower temperatures contact time may be as high as 20 seconds. In the better embodiments of the invention, i. e. using the preferred 375–550° C. temperature range, contact times of not less than 5 seconds, preferably not less than 10 seconds are preferred. Generally speaking, best yields of CCl₃CF₃ are had at the higher temperatures and longer contact times. Atmospheric or superatmospheric pressure may be used.

The invention reactions may be carried out in the absence or presence of hydrogen fluoride preferably anhydrous. In the circumstance of the absence of HF, the reaction effected is one of disproportionation. For instance, when the starting material is CCl₃CClF₂, the reaction appears to proceed in accordance with

Generally, it is preferred to carry out the operation in the presence of anhydrous HF, in which case the HF may be reacted with for example C₂Cl₆, C₂FCl₅, CCl₃CClF₂, or the HF may be reacted with a chlorine-C₂Cl₄ mixture which in this art appears to be the equivalent of C₂Cl₆. Illustrating again with the use of CCl₃CClF₂ as the starting material, the reaction appears to proceed in accordance with

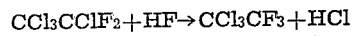

In this circumstance the reactor exit gas may be scrubbed with water to remove acidic content of the gas stream, dried, cooled to zero-15° C. and the resulting crude condensate redistilled to recover a fraction falling within the range of e. g. 46–48° C. In those embodiments of the invention in which one of the reactants is HF, it is preferred to use HF and a starting material in the mol ratio range of 1:1–1:2.5.

In all of the above reactions, some relatively small amounts of CCl₂FCClF₂ may be produced and such material, if formed, will be included, together with the CCl₃CF₃ in the 45–49° C. fraction. Even though the boiling point of this fraction is in the indicated range, the melting point of such fraction may lie any place within the range of about plus 15° C. down to say minus 20–25° C. dependent upon the relative amounts of CCl₃CF₃ and CCl₂FCClF₂ contained in the fraction. While melting point is not strictly indicative of composition, melting point may be used as an approximate test for proportionate amounts of CCl₃CF₃ and CCl₂FCClF₂ in the 45–49° C. fraction. If an ultimate product containing substantially no CCl₂FCClF₂ is desired, the latter compound may be converted to CCl₃CF₃ by the aluminum chloride treatment described.

In one example of practice of the invention, 55 parts by weight of commercial anhydrous lithium chloride were dissolved in 150 parts of water, and the solution was mixed with 110 parts of Columbia 6W activated carbon, 8–14 mesh. The mass was evaporated to dryness, and then gassed in a nickel reactor with anhydrous HF at temperature of about 200° C. until evolution of HCl and water ceased. CCl₃CClF₂ was the starting material employed. Since CCl₃CClF₂, B. P. 92.3° C., has a melting point of about 40.6° C., handling of the latter at room temperature is inconvenient but may be facilitated by mixing same with a relatively small amount of CCl₂FCClF₂ which mixture is a liquid at room temperature. Hence, the inorganic compound starting material employed in this run was a liquid mixture containing by weight 80% CCl₃CClF₂ and 20% CCl₂FCClF₂. This mixture was vaporized and mixed with gaseous anhydrous HF in quantity such that the resulting gas mixture had an HF:CCl₃CClF₂ mol ratio of 0.7. Such mixture was metered into and through a nickel reactor packed with the above described granular catalyst consisting of 24% by weight of lithium fluoride disseminated on 76% of activated carbon. Temperature was maintained at about 475° C., and operation was such that the contact time was about 8 seconds. About 64% of the HF reacted. The organic product after cooling and condensation was fractionated and a fraction having a boiling point of 46–48° C. was obtained. Freezing point of this mixture was in the range of minus 5 to zero ° C., which melting point indicates a product containing a major portion of CCl₃CF₃ together with some CCl₂FCClF₂. It will be understood that the CCl₂FCClF₂ contained in the material fed to the reactor contributed largely to the low melting point value.

In another example, 100 parts by weight of Columbia 6G carbon was impregnated with 50 parts of lithium chloride in water and the whole evaporated to dryness. The mass was thoroughly dried in nitrogen and gassed at 200° C. with anhydrous HF until no more water or HCl was evolved. During two hours, 320 parts of a solution containing by weight 80% CCl₃CClF₂ and 20% CCl₂FCClF₂ was vaporized, and was passed at about 475° C. over the catalyst composed of 24% LiF on 76% of activated carbon. Contact time was about 14 seconds. The reaction product was condensed at about 15° C. and no gas passed the condenser. 37% of the CCl₃CClF₂ reacted, and on fractionating, 92 parts having a boiling point in the range of 46–48° C. and a melting point of about minus 25° C. were obtained, this fraction including substantially all of the CCl₂FCClF₂ initially fed into the reactor.

I claim:

1. The process for making CCl₃CF₃ which comprises heating a completely chlorofluoro halogenated ethane containing not less than four chlorine atoms to temperature in the range of 250°–600° C. while in the presence of lithium fluoride-activated carbon catalyst.

2. The process for making CCl₃CF₃ which comprises heating a completely chlorofluoro halogenated ethane containing not less than four chlorine atoms to temperature in the range of 375–550° C. while in the presence of lithium fluoride on activated carbon.

3. The process for making CCl₃CF₃ which comprises heating CCl₃CClF₂ to temperature in the range of 375–550° C. while in the presence of lithium fluoride on activated carbon.

4. The process for making CCl₃CF₃ which comprises reacting together in vapor phase hydrogen fluoride and a compound corresponding with the formula C₂Cl₆−xFx, where x=0, 1 or 2, at temperature in the range of 250°–600° C. while in the presence of lithium fluoride-activated carbon catalyst.

5. The process for making CCl₃CF₃ which comprises reacting together in vapor phase hydrogen fluoride and a completely chlorofluoro halogenated ethane containing not less than four chlorine atoms at temperature in the range of 250–600° C. while in the presence of lithium fluoride-activated carbon catalyst.

6. The process for making CCl₃CF₃ which comprises reacting together in vapor phase hydrogen fluoride and a completely chlorofluoro halogenated ethane containing at least four chlorine atoms at temperature in the range of 375°–550° C. while in the presence of lithium fluoride on activated carbon.

7. The process for making CCl₃CF₃ which comprises reacting together in vapor phase hydrogen fluoride and $CCl_3CClF_2$ at temperature in the range of 375–550° C. while in the presence of lithium fluoride on activated carbon.

8. The process for making $CCl_3CF_3$ which comprises reacting together in vapor phase hydrogen fluoride and $CCl_3CClF_2$ in mol ratio in the range of 1:1–1:2.5 at temperature in the range of 375–550° C. for a period not less than five seconds while in the presence of lithium fluoride on activated carbon.

References Cited in the file of this patent

UNITED STATES PATENTS

| Number | Name | Date |
|---|---|---|
| 1,914,135 | Lacy | June 13, 1933 |
| 2,146,725 | Dunphy | Feb. 14 1939 |
| 2,519,199 | Salisbury | Aug. 15, 1950 |

OTHER REFERENCES

Bither et al., J. A. C. S., 67, 1562 to 1566.